Figure 1:
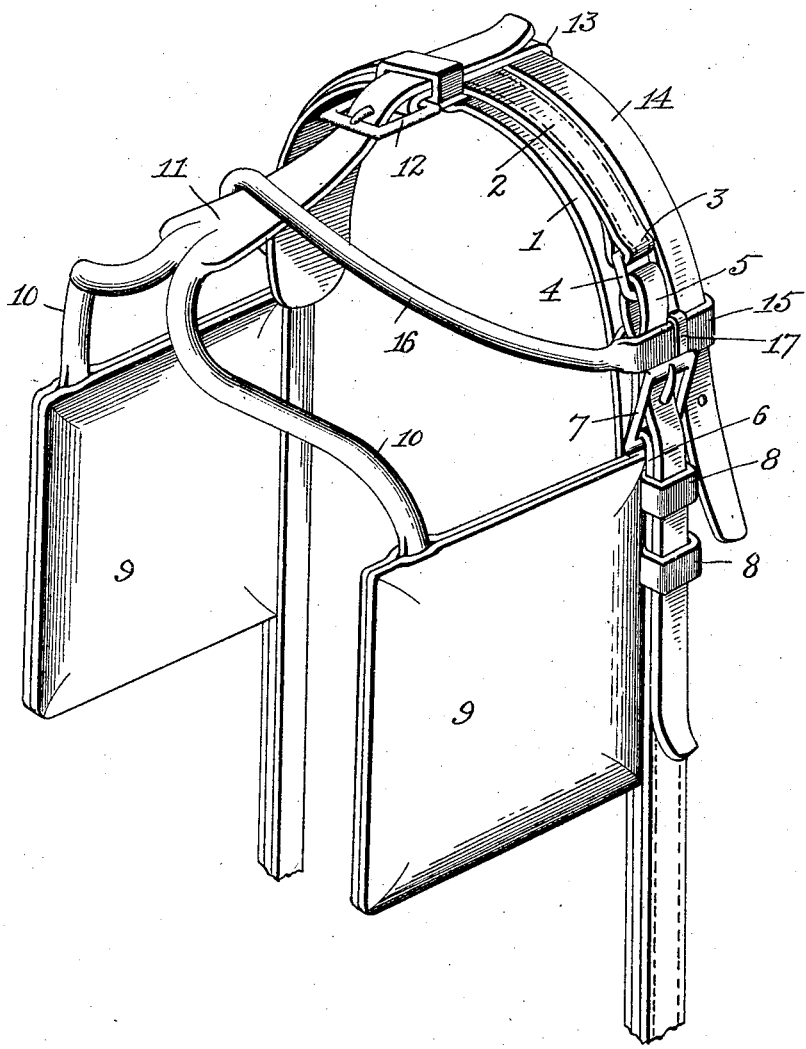

No. 876,715. PATENTED JAN. 14, 1908.
S. D. HAWK.
BRIDLE.
APPLICATION FILED NOV. 22, 1906.

2 SHEETS—SHEET 1.

No. 876,715. PATENTED JAN. 14, 1908.
S. D. HAWK.
BRIDLE.
APPLICATION FILED NOV. 22, 1906.
2 SHEETS—SHEET 2.
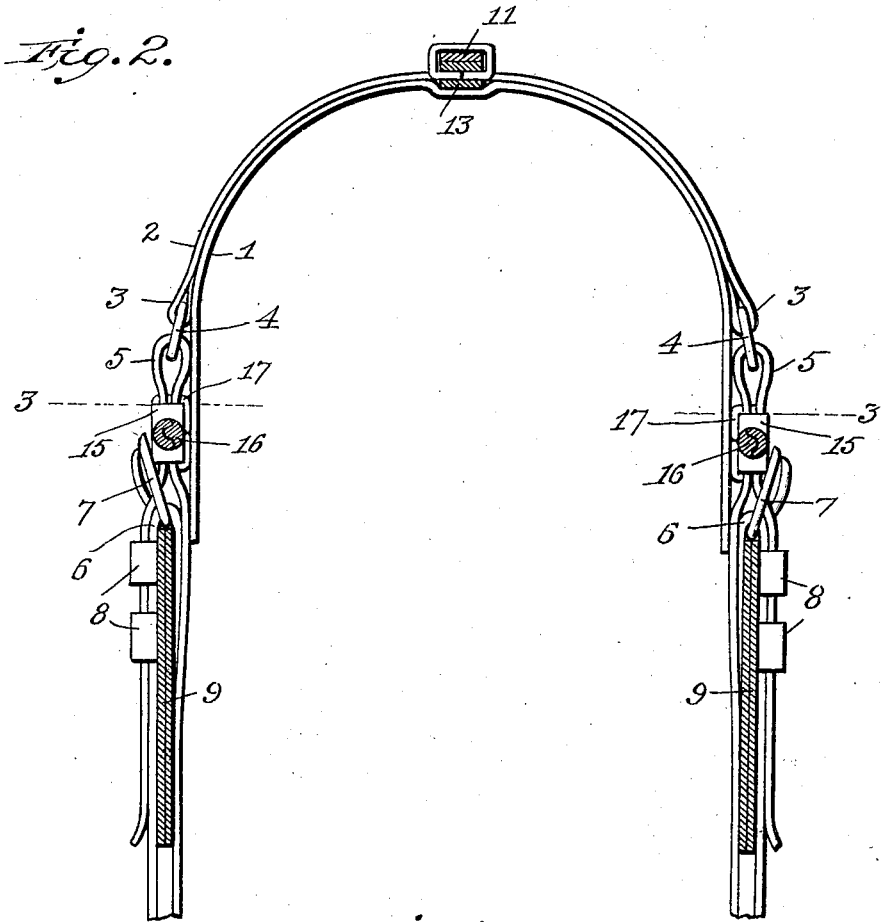
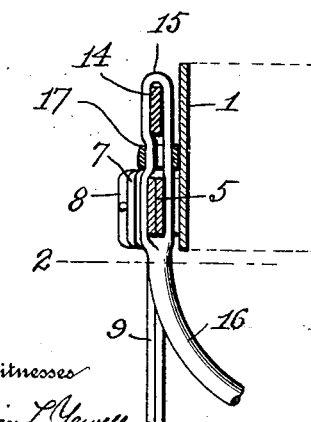
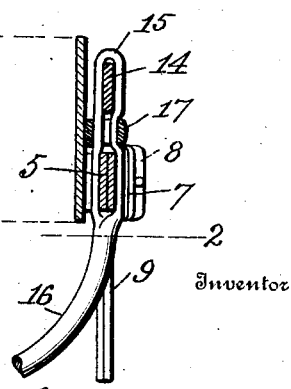

UNITED STATES PATENT OFFICE.

SAMUEL D. HAWK, OF MINNEAPOLIS, KANSAS.

BRIDLE.

No. 876,715.                    Specification of Letters Patent.              Patented Jan. 14, 1908.

Application filed November 22, 1906. Serial No. 344,640.

*To all whom it may concern:*

Be it known that I, SAMUEL D. HAWK, a citizen of the United States, and a resident of Minneapolis, in the county of Ottawa and State of Kansas, have invented certain new and useful Improvements in Bridles, of which the following is a full, clear, and exact description, such as will enable those skilled in the art to which it appertains to make and use the same, reference being had to the accompanying drawings, forming a part of this specification.

The invention relates to improvements in bridles of that description which form a part of the harness for a horse.

It has for its object the provision of means whereby the device can be readily fitted and adjusted to the horse's head and in which chafing is prevented. It also has for its object the provision of a device that will be of simple and cheap construction and, at the same time, one which will be efficient in its purpose.

The invention consists in the novel construction, combination and arrangement of parts, such as will be hereinafter fully described, pointed out in the appended claims, and illustrated in the accompanying drawings.

In the drawings, in which similar reference characters designate corresponding parts, Figure 1 is a perspective view of the upper part of a bridle embodying the invention. Fig. 2 is a sectional view on the line 2—2 of Fig. 3. Fig. 3 is a similar view on the line 3—3 of Fig. 2.

As that part of the bridle below the blinds is of the usual construction, such part is not shown nor described.

The crown-piece 1 fits over the top of the head and its ends extend downward behind the ears. It has considerable width and thereby prevents the parts mounted thereon from coming in contact with the head to chafe the same. On the front edge of the crown-piece is sewed the strap 2 having at its ends the loop 3 in which are the rings 4. This strap 2 is much shorter than the crown-piece so that the rings 4 are considerable distance above the ends of the crown-piece. In the rings 4 are looped the double cheek billets 5. The members of each billet extend downward on opposite sides of the blind support 6. The inner member of the billet is sewed to the blind support and the outer member engages with the buckle 7 in the loop at the upper end of the blind support. On the blind-support, below the buckle 7, are the straps 8 to receive the free end of the outer member of the billet. By means of the buckle 7 the length of the billet can be regulated to give the required adjustment of the blind support relative to the crown-piece. As the ends of the crown-piece extend below the rings 4 and the buckles 7, chafing of the head by said members and the parts connected thereto is prevented.

Between the members of the supports 6 are secured the blinds 9 connected at their upper outer corners by the spreaders 10. The inner ends of the latter meet in the flat strap 11, the free end of which engages the buckle 12 in the end of the strap 13 looped around the strap 2 above the crown-piece 1. By means of the buckle 12 and the flat strap 11 the spreaders 10 can be adjusted to regulate the position of the blinds. Through the loop in the rear end of strap 13 passes the strap 14 extending parallel with the strap 2 on the crown-piece 1. To the ends of the strap 14 the usual throat-latch (not shown) is adjustably attached. As the strap 14 is adjustable in the loop of the strap 13, the said strap 14 can be regulated to accommodate the throat-latch.

Encircling each cheek billet 5 and the adjacent end of the throat-latch strap 14 is the loop 15 of the brow-band 16 extending across the fore-head in front of the ears when the bridle is in place. The throat-latch strap 14 is separated from the members of the billet by the clip-ring 17 clamped around the loop 15 of the brow-band. By dividing the loop in this way and separating the throat-latch strap from the billet, both of the latter are held in their proper relative positions.

Having thus described my invention, what I claim and desire to secure Letters Patent is,

1. In a bridle, a crown-piece, a fixed strap on the forward edge of said crown-piece, blinds connected with the ends of said fixed strap, a movable throat-latch strap on the rear edge of said crown-piece, a strap secured to the top of the crown-piece and looped around said fixed strap and the movable throat-latch strap, a buckle in the forward loop of said strap secured to the top of the crown-piece, and spreaders secured at their outer ends to said blinds and engaged at their inner ends by said buckle.

2. In a bridle, a crown-piece, a fixed strap on the forward edge of said crown-piece, blind-supports, blinds secured to said blind-supports, adjustable cheek billets connecting said blind-supports with the ends of said fixed strap, a movable throat-latch strap on the rear edge of said crown-piece, a strap secured to the top of said crown-piece and looped around said fixed strap and said movable throat-latch strap, a buckle in the forward loop of said strap secured to the top of the crown-piece, and spreaders secured at their outer ends to said blinds and engaged at their inner ends by said buckle.

3. In a bridle, a crown-piece, a fixed strap on the forward edge of said crown-piece extending but part way toward the ends thereof, rings in the lower ends of said fixed strap, blind-supports over-lapping at their upper ends the lower ends of said crown-piece, blinds secured to said blind-supports, buckles in the upper ends of said blind-supports, double cheek billets looped in said rings with each billet secured at one end to the adjacent blind-support and engaged at the other end by the adjacent buckle, a movable throat-latch strap on the rear edge of the crown-piece, a strap secured to the top of the crown-piece and looped around said fixed strap and said movable throat-latch strap, a buckle in the forward loop of said strap secured to the top of the crown-piece, spreaders secured at their outer ends to said blinds and engaged at their inner ends by said buckle in the forward loop of the strap secured to the top of the crown-piece, a brow-band looped at its ends around the cheek billets and the ends of the throat-latch strap, and clips clamped around the looped ends of said brow-band between the cheek billets and the ends of the throat latch strap.

In testimony whereof I hereunto affix my signature in the presence of two witnesses.

SAMUEL D. HAWK.

Witnesses:
  J. E. EWART,
  W. M. TRUITT.